Sept. 25, 1956   L. HAWORTH   2,764,266
SEPARABLE JOINTS
Filed Feb. 6, 1953   3 Sheets-Sheet 1
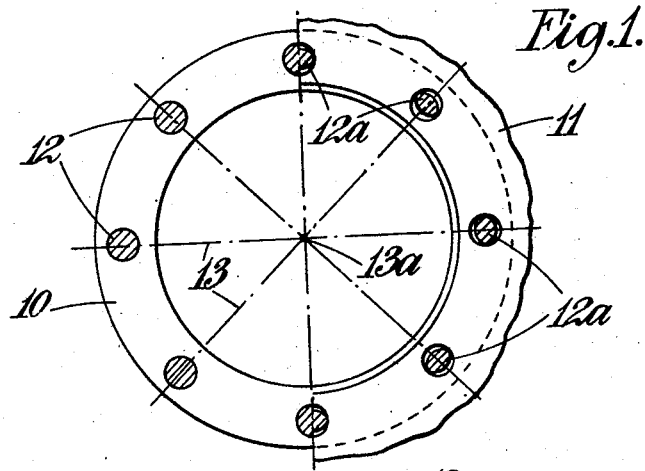
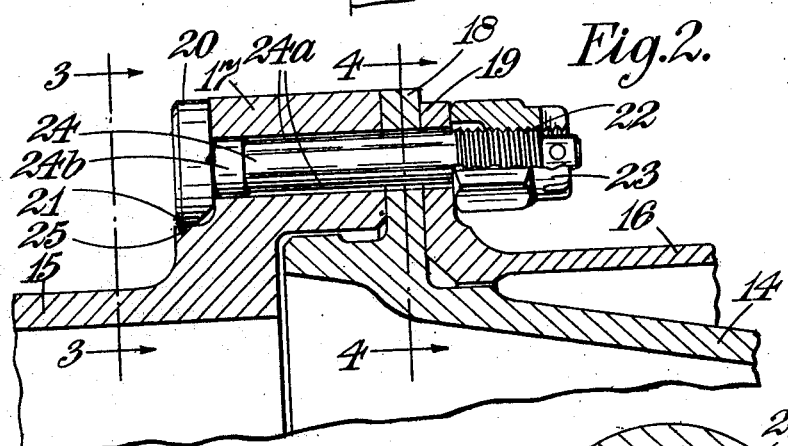
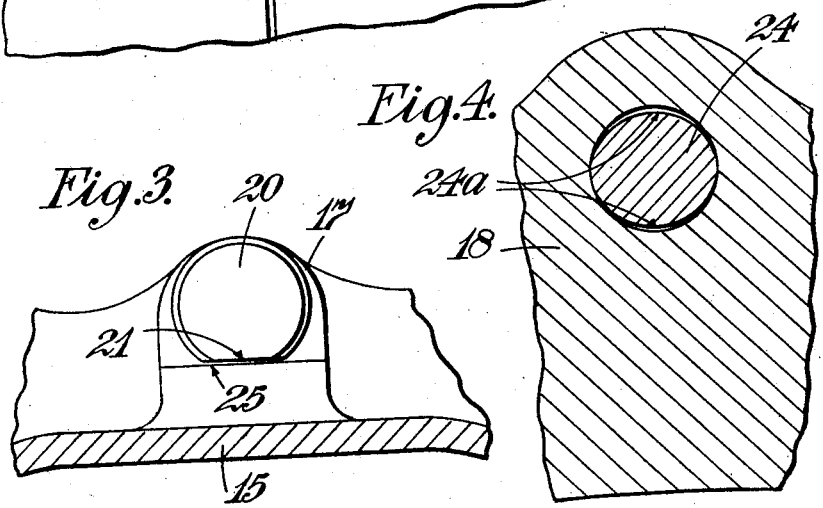

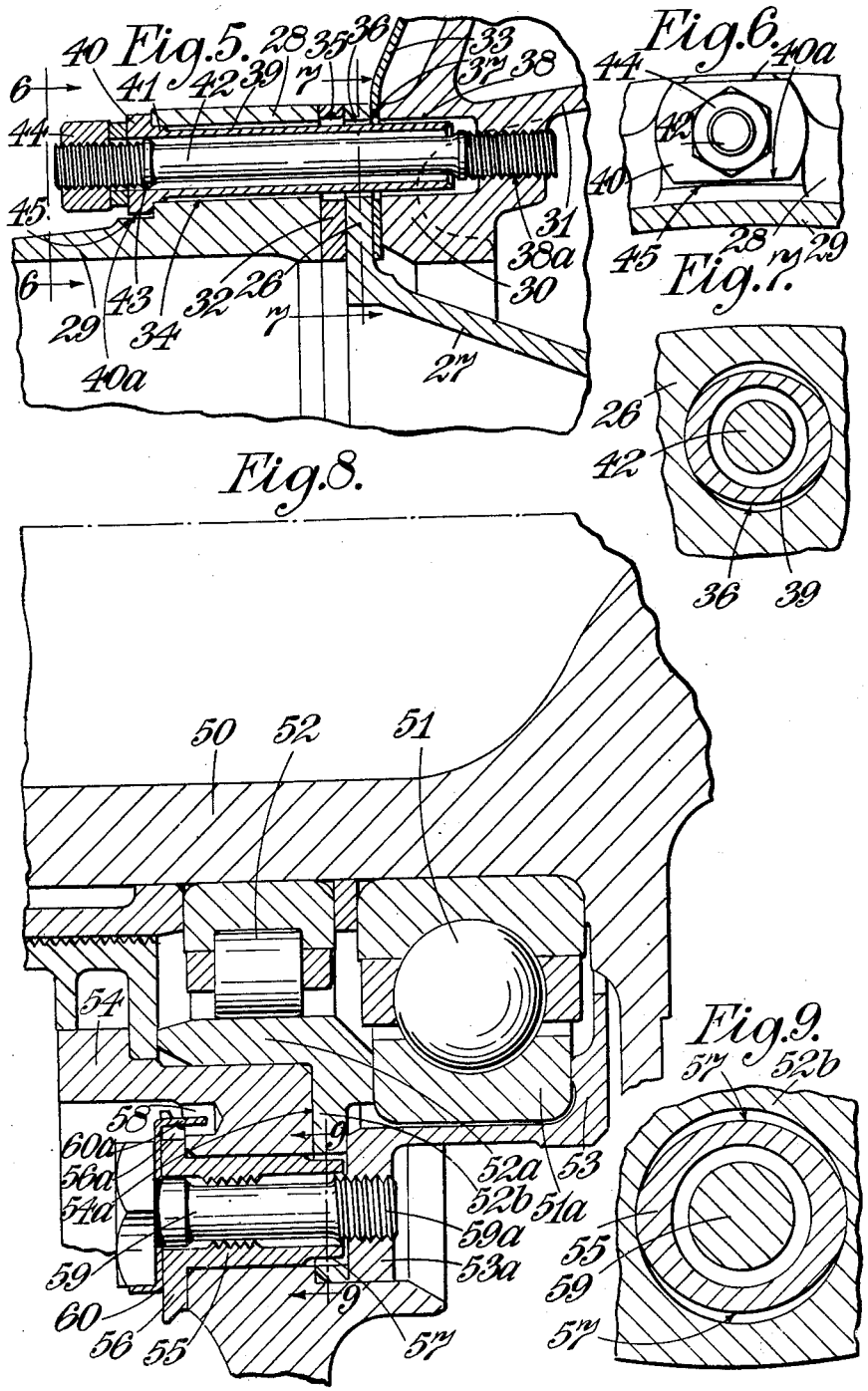

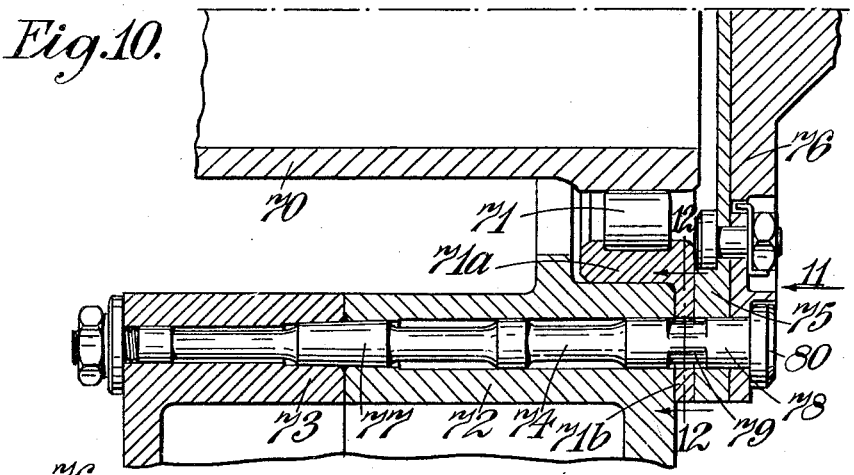
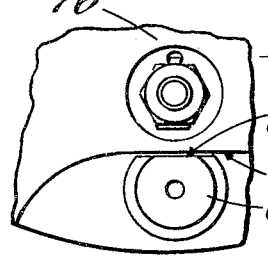
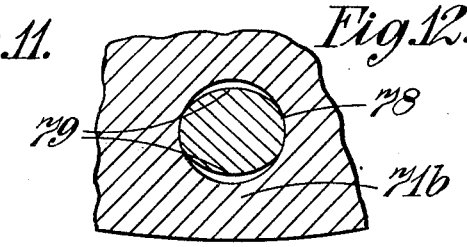
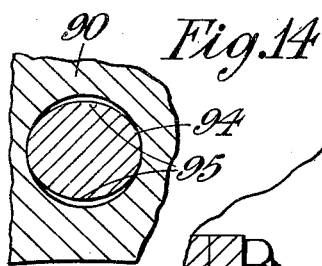
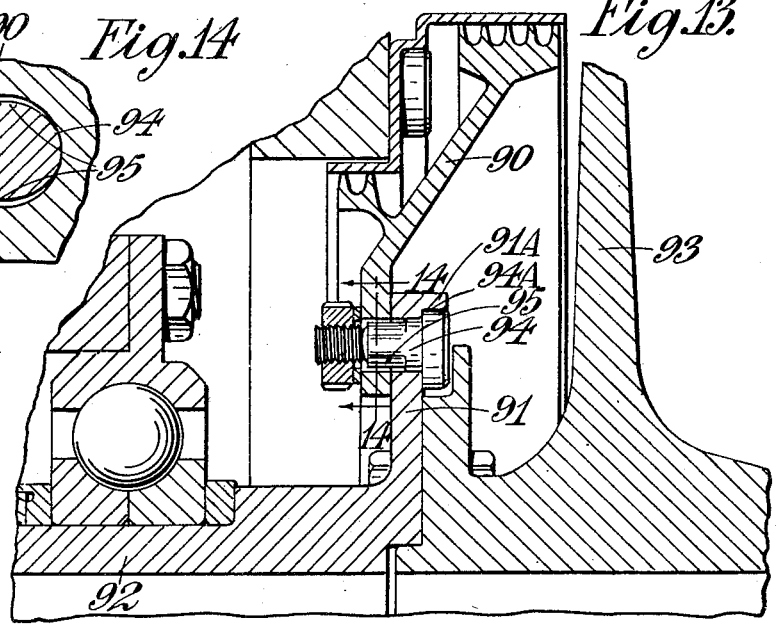

United States Patent Office 2,764,266
Patented Sept. 25, 1956

2,764,266

SEPARABLE JOINTS

Lionel Haworth, Littleover, England, assignor to Rolls-Royce Limited, Derby, England, a British company Application February 6, 1953, Serial No. 335,518

Claims priority, application Great Britain February 13, 1952

9 Claims. (Cl. 189—36)

This invention relates to separable joints, that is joints in which the parts joined are held together by securing elements such for example, as bolts, or dowel pins.

The primary object of the invention is to provide an improved separable joint between parts which in use tend to expand or contract differentially about a focal point or axis. Examples of such joints occur in gas turbine engines where often two parts of differing materials are interconnected at a flanged or equivalent joint, which parts are subjected internally or externally to a heated gas, so that owing to the differing coefficients of thermal expansion of the materials differential expansion tends to take place between the parts. Another example is a joint between a steel bearing-race structure and a light alloy structure within which the bearing-race is secured. Another example of such a joint is where two joined parts of similar materials are subjected to differing temperatures whereby a relative expansion tends to take place at the joint between these parts.

According to the present invention, in a structure including parts secured together by a separable joint comprising a plurality of securing elements interconnecting the parts, each of said securing elements has an axial portion whereof the cross-section is substantially oval and engages in a circular aperture in one at least of the parts, the apertures which receive the oval portions having a diameter to fit the major axis of the oval portions, and the securing elements are located with respect to the parts so that the oval portions have their minor axes meeting substantially at a point or on an axis about which relative radial expansion of the parts tends to take place.

The invention may be applied to separable joints comprising two or more parts which are to be secured together by a plurality of securing elements, and the oval portions of the elements may engage one or more of the parts. Thus in the case of a simple flanged joint in which the securing elements are bolts, the shank portion of the bolt throughout its unthreaded axial length may conveniently be of uniform oval cross-section. Alternatively in the case of a joint comprising a plurality of studs as the securing elements, the studs will be screwed in one part and will have a portion of oval cross-section extending through circular apertures in one or more parts to be secured to the first part. Again when the securing elements are dowel pins, the pins may be bored axially to receive holding bolts.

The invention provides freedom in the joint for relative radial expansion about the point or axis at which the minor axes of the oval portions meet, and by virtue of the fitting engagement of the securing elements on the major axes of the oval portions, the parts are retained with respect to one another to maintain their relative dispositions correctly with respect to said point or axis.

The invention may conveniently be applied to joints of the flanged kind in which the plurality of securing elements are arranged so their longitudinal axes lie substantially in the surface of a cylinder of which the axis is the axis about which relative radial expansion tends to occur.

In other arrangements the flanges may be elliptical and the securing elements may be arranged with their long axes in a surface of elliptical cross-section, and in this case the minor axes of the oval portions of the securing elements will preferably be arranged to meet at the centre of the ellipse.

According to a feature of the invention, the securing elements used in the separable joints are formed with features co-operating with complementary features of one or more of the parts to ensure that in the assembly the axes of the oval portion are disposed in the manner stated. Thus, for example, a locating flat may be provided on the head of a bolt in a selected position with respect to the axes of the oval portion of the shank which flat co-operates with a selected surface on one of the parts.

Some embodiments of this invention will now be described by way of example, reference being made in the description to the accompanying drawings in which—

Figure 1 is a diagrammatic view illustrating the invention,

Figure 2 illustrates in section one practical embodiment of joint according to this invention, Figure 3 is a section on the line 3—3 of Figure 2, Figure 4 is a section on the line 4—4 of Figure 2, Figure 5 is an axial section through a second embodiment of separable joint according to this invention, Figure 6 is a section on the line 6—6 of Figure 5, Figure 7 is a section on the line 7—7 of Figure 5, Figure 8 illustrates in axial section yet another practical embodiment of separable joint according to this invention, Figure 9 is a section on the line 9—9 of Figure 8, Figure 10 illustrates yet another embodiment of separable joint according to this invention, Figure 11 is a view on the arrow of Figure 10, Figure 12 is a section on the line 12—12 of Figure 10, Figure 13 illustrates yet another embodiment of separable joint of this invention applied to rotating parts, and Figure 14 is a section on the line 14—14 of Figure 13.

Referring to Figure 1, there is illustrated diagrammatically the form of separable joint according to this invention by which two parts 10 and 11 may be secured together by means of a ring of securing elements 12 which may be bolts, dowel pins or the like. The securing elements 12 have circular section portions which fit in holes in the part 10 and substantially oval-section portions 12a which extend through holes in the part 11 which holes have a diameter to accommodate the maximum cross-sectional dimension, that is, the major axis of the oval-section portions 12a. The securing elements are all disposed so that the lines of the minimum cross-sectional dimensions which extend substantially at right angles to the lines of the maximum dimensions, that is, the minor axes 13 of the oval-section portions 12a meet at the centre 13a of the pitch circle of the holes in the parts 10 and 11 for receiving securing elements 12.

With this arrangement the parts 10 and 11 are left free to expand relative to one another in a direction radially from the centre 13a but are held coaxial and are also held against circumferential displacement with respect to one another.

Referring now to Figures 2 to 4, the invention is illustrated as applied in a bolted flange connection by which say a turbine bearing housing 14 is supported from an intermediate casing structure 15, said flange connection additionally supporting wall element 16 of a turbine nozzle box structure.

In this embodiment, the intermediate casing 14 is assumed to be formed from magnesium alloy, the turbine bearing support structure is assumed to be formed from an aluminium alloy and the wall element 16 of the nozzle box structure is assumed to be formed from a heat-resisting steel. Since the temperature in the region of the joint in operation of the engine may be of the order of 200/250° C. substantial differential expansion will occur between the parts.

The parts 14, 15, 16 are formed each with a radially extending flange, 17, 18, 19 respectively, of circular form, and the flanges are drilled at circumferentially-spaced points with circular holes for the reception of retaining bolts. The bolts have round heads 20 which are partly machined away to provide each with a locating flat 21, and a shank with threaded portion 22 to be engaged by nuts 23. The shanks of the bolts also have unthreaded portions 24 which are machined initially to be circular and to have a diameter corresponding to that of the circular holes in the flanges 17, 18, 19, and the unthreaded portions 24 of the shanks are then relieved as indicated at 24a for part of their length each over opposite portions of its cylindrical surface by grinding away the surface in a manner to provide a substantially oval section, the major axis of which lies substantially parallel to the locating flat 21 on the round head 20. The locating flat 21 co-operates with a radially outward-facing surface 25 on the flange 17, so that when the bolt is inserted the major axis of the oval portion of the unthreaded portion 24 of the shank lies substantially on the circumference of the pitch circle of the bolt holes. The minor axes of oval section portions of the bolt shanks therefore extend substantially radially to meet at the centre of the pitch circle, i. e. the point about which relative radial expansion of the parts 14, 15, 16 will take place in operation of the engine due to the differing coefficients of expansion of the materials used. The shanks also have a short unrelieved portion 24b, which fits the ends of the bore in the flange 17 so that there is no relative radial displacement between the part 15 and the bolts.

Referring now to the Figures 5 to 7, there is shown an arrangement of separable joint such as may be employed in a gas-turbine engine to interconnect a flange 26 on the bearing housing 27 of a turbine bearing with a thick flange 28 on an intermediate casing member 29, which encircles the engine shaft connecting a turbine and a compressor and which is supported by the bearing, and a thick flange 30 on a nozzle casing 31 for the turbine inlet nozzles, which nozzle casing interconnects the intermediate member and the turbine casing. The separable joint also includes a washer 32 and a second casing member 33.

The flanges 26, 28, 30, the washer 32 and casing 33 have a ring of aligned bores 34, 35, 36, 37, 38, the bores 38 in the flange 30 on the nozzle casing having at their ends remote from the other bores 34—37 internally-threaded, reduced diameter portions 38a.

The flanges are located circumferentially and concentrically by securing elements in the form of hollow dowel pins 39. Each dowel pin 39 has a flanged head 40 at one end and extends through a set of aligned bores 34, 35, 36, 37 in the flanges 28 and 26, and in the washer 32 and casing 33 into the larger diameter end of the bore 38 in the flange 30 of the nozzle casing 31. Each dowel pin has an axially-short portion 41 of its shank made of circular cross-section to fit into one end of the bore 34 in the flange 28 on the intermediate casing 29, and the remainder of the shank is relieved to be of substantially oval cross-section (Figure 7) with the major axis equal to the bore diameter and with the minor axis directed towards the engine axis thus to accommodate relative expansion between the parts carrying the flanges. It will be seen that, as in the construction of Figures 2 to 4, the oval formation is produced by grinding or otherwise removing opposite portions of the cylindrical surface of the shank so as to leave part-cylindrical surface portions between the relieved surface portions.

The heads 40 have flats 40a to co-operate with flats 45 on the flange 28 so that the dowels can be located with the minor axes of the oval portions meeting on at the centre of the bolt hole pitch circle.

The flanges are gripped together by studs 42 which engage at one end in the internally-threaded parts 38a of the bores 38 in the nozzle casing flange 30. The studs 42 extend through the hollow dowel pins 39 with a clearance therefrom except locally over narrow lands 43 adjacent the flanged heads 40, and the studs are engaged by nuts 44 at their opposite ends.

Referring now to Figures 8 and 9, there is illustrated a shaft bearing arrangement which comprises a rotary member 50 supported in coaxial ball and roller bearings 51, 52, and the bearings are accommodated in a light alloy casing structure 54 in the following manner.

The roller bearing 52 has its outer race 52a formed with a radial flange 52b and the ball bearing 51 has its outer race 51a received in a clamping ring 53 having a radial flange 53a extending outwards from an axially-extending portion thereof. The flange 52b on the race 52 is sandwiched between the flange 53a on the clamping ring 53 and a radially-extending surface 54a on the casing 54.

The casing 54 and flanges 52b and 52a have each a ring of circular holes on equal pitch circles and of equal spacing, and the holes in the casing 54 and the flange 52b are of larger diameter than those in the flange 53a, and the holes in the flange 53a are threaded.

Hollow dowel pins 55 are provided to extend through the holes in the casing 54 and the flange 52b; each dowel has a flanged head 56 to abut the casing 54, is of circular section to fit the hole in the casing 54, and is relieved at 57 to be oval where it extends into the hole in the flange 52b. The flanged heads 56 are notched at 56a and the notches are lined up with recesses 58 in the casing 54.

Bolts 59 extend through the hollow dowel pins 55 and engage by their threaded ends 59a in the threaded holes in the flange 53a to clamp the parts together.

Locking washers 60 are provided and the washers have tabs 60a to enter the notches 56a and recesses 58 to locate the dowel pins 55 with their minor axes meeting on the bearing axis.

Referring now to Figures 10 to 12, there is illustrated an arrangement in which a rotating part 70 is supported in a bearing 71 accommodated in a stationary structure formed by a number of light alloy parts 72, 73, 75, 76 in a manner to accommodate relative expansion between the outer race 71a of the bearing 71 and these parts. The outer race 71a has a radial flange 71b formed with a ring of circular holes to receive bolts 74, the shanks of the bolts being relieved as indicated at 79 in the region of the flange 71b to give them an oval form. The parts 72, 73 are located by a taper land 77 engaging taper bores in these parts and the parts 75, 76 are located by a circular land 78 of the shank fitting in corresponding bores. The bolts 74 have heads 80 formed with flats 81 to co-operate with flats 82 on the part 76 thereby to locate the bolts 74 with the minor axes of the oval portions 79 directed towards the bearing axis.

Referring now to Figures 13 and 14, there is illustrated the use of the invention in securing a rotating labyrinth seal member 90 to a flange 91 on the end of a shaft 92 of a turbine rotor 93. As in the other arrangements the parts 90, 91 to be joined have a ring of aligned bolt holes therein, each set of aligned holes having a bolt 94 extending through them, the shank of the bolt having a relieved portion 95 in the region of one of the parts 90, 91 so that the shank in this region is substantially of oval section with the minor axis extending through the axis of rotation of the rotating parts. The bolt 94 is formed with a flat 94a co-operating with a flange extension 91a on the part 91.

I claim:

1. A structure comprising a plurality of parts to be joined together, there being a ring of circumferentially-spaced, circular holes in each part, the ring of holes in one part having the same pitch circle diameter as the ring of holes in the second part and the same circumferential spacing so that when the parts are in axial abutment the holes in the one part are aligned with those in the second part, a plurality of securing elements interconnecting the parts, each of said securing elements having an axial portion whereof the cross-section is substantially oval and engages in one of the circular holes in one at least of the parts, the substantially oval portions each having a maximum cross-sectional dimension to fit the holes and a minimum cross-sectional dimension substantially along a line at right angles to the line of the maximum dimension, and means to locate the securing elements with respect to the parts so that the oval portions of the securing elements have the lines of their minimum dimensions meeting on an axis through the centres of the pitch circles of the rings of holes.

2. A structure as claimed in claim 1, having the substantially oval portions of the securing elements comprising oppositely-disposed part-cylindrical surface portions having a diameter equal to said maximum cross-sectional dimension interconnected by oppositely-disposed relieved surface portions.

3. A structure as claimed in claim 1, having each securing element provided also with a circular-section portion to fit in the hole in one at least of said parts other than said part having the oval portions engaged therein.

4. A structure as claimed in claim 1, having said means to locate the securing elements comprising a head on each securing element, the heads being adapted to co-operate with another part of the structure to locate the securing elements with respect to the structure to restrain the securing elements against rotation in the holes from the position in which the lines of minimum cross-sectional dimension intersect on said axis.

5. A structure as claimed in claim 4, having the head of each securing element formed with a flat to co-operate with a flat surface on the structure.

6. A structure as claimed in claim 1, having said means to locate the securing elements comprising a head on each securing element, there being a notch formed in each head, and locking washers, each having a first tab to engage one of the notches and a second tab to engage a recess in said structure.

7. A structure as claimed in claim 1, having the securing elements in the form of screw-threaded elements.

8. A structure as claimed in claim 1, having the securing elements in the form of dowel pins.

9. A structure as claimed in claim 8, having the dowel pins of hollow form and comprising also retaining screw-threaded elements adapted to extend through the hollow dowel pins to hold the parts against separation axially of the dowel pins.

References Cited in the file of this patent

UNITED STATES PATENTS

| | | |
|---|---|---|
| 432,526 | Greer | July 22, 1890 |
| 1,761,581 | Northey et al. | June 3, 1930 |
| 1,773,200 | Price | Aug. 19, 1930 |
| 2,050,961 | Olson | Aug. 11, 1936 |
| 2,371,614 | Graves | Mar. 20, 1945 |
| 2,479,046 | Ledwith | Aug. 16, 1949 |

FOREIGN PATENTS

| | | |
|---|---|---|
| 584,023 | Germany | Sept. 27, 1933 |